(12) United States Patent
Johns

(10) Patent No.: US 7,442,915 B2
(45) Date of Patent: Oct. 28, 2008

(54) SIGNAL CONDITIONING CIRCUITRY

(75) Inventor: David Johns, Ringwood (GB)

(73) Assignee: Advanced Input Devices (UK) Ltd, Ringwood, Hampshire (GB)

( * ) Notice: Subject to any disclaimer, the term of this patent is extended or adjusted under 35 U.S.C. 154(b) by 47 days.

(21) Appl. No.: 11/233,919

(22) Filed: Sep. 22, 2005

(65) Prior Publication Data

US 2006/0065816 A1 Mar. 30, 2006

(30) Foreign Application Priority Data

Sep. 24, 2004 (GB) ................. 0421372.4

(51) Int. Cl.
*G06M 7/00* (2006.01)

(52) U.S. Cl. ............... 250/221; 250/214 R; 345/166

(58) Field of Classification Search .......... 250/221, 250/214 R, 214 C, 214 A; 345/164, 165, 345/166

See application file for complete search history.

(56) References Cited

U.S. PATENT DOCUMENTS

| 4,210,775 A | 7/1980 | Rodgers et al. | |
| 5,644,127 A | * 7/1997 | Ohmae | 250/231.16 |
| 5,877,752 A | * 3/1999 | Puthuff et al. | 345/180 |
| 6,222,182 B1 | * 4/2001 | Featherston et al. | 250/231.13 |
| 2002/0170399 A1 | * 11/2002 | Gass et al. | 83/62.1 |

FOREIGN PATENT DOCUMENTS

| GB | 2044446 A | 10/1980 |
| JP | 57145425 A | 9/1982 |
| JP | 04123123 A | 4/1992 |

* cited by examiner

*Primary Examiner*—Kevin Pyo
(74) *Attorney, Agent, or Firm*—Townsend and Townsend and Crew LLP.; Henry Heines

(57) ABSTRACT

This invention relates to signal conditioning circuitry 14a for an optical pointing device, the circuitry comprising: means 15a for determining the rate of change of a signal generated on periodic illumination of a photodetector, and outputting a signal representative of said determined rate of change; and means 17a for comparing the signal output by said determining means to a reference voltage.

11 Claims, 2 Drawing Sheets

SIGNAL CONDITIONING CIRCUITRY

This invention relates to signal conditioning circuitry for an optical pointing device, such as a trackball or a mouse.

Pointing devices, such as mice and trackballs, are well-known devices that can be used in computer systems to facilitate the control of a pointer depicted on a display screen. Pointing devices also find utility in other items of equipment where it is desired to move a pointer on a screen (such as certain items of medical equipment) or to control peripherals such as robotic arms. In the following description, particular reference will be made to mice for computer systems, but it is understood the invention is not limited solely to mice.

As is known in the art, an operator can use a mouse as a pointer by moving the mouse to generate signals which are interpreted by the computer system and used to control a pointer which moves a direction and distance on the screen of the computer system that is proportional to the movement of the mouse.

Some mice make use of changes in light reflectance as the mouse is moved over a surface and others use a mechanical mechanism where movement of the mouse causes a ball inside the mouse to rotate and drive so-called shaft encoders. The encoders are associated with appropriate sensing devices that translate rotation of the encoder shafts into signals which are indicative of the rotation imparted to the ball and hence the movement of the mouse. The present invention is equally applicable to both of these types of optical pointing devices.

One illustrative prior art device includes shaft encoders that each carry a slotted encoder disk arranged to rotate between a light source, often an LED, positioned on one side of the encoder disk, and a pair of photosensors, such as a pair of phototransistors, positioned generally opposite the light source. Rotation of the encoder disk causes a series of light pulses to be received by the photosensors, which in turn generate generally sinusoidal output current signals. Those signals are conditioned, by appropriate circuitry, the like of which is described below, before being passed to a system which is operable to determine both the direction and speed of rotation of the ball in both of the X and Y axes.

Figure 1:
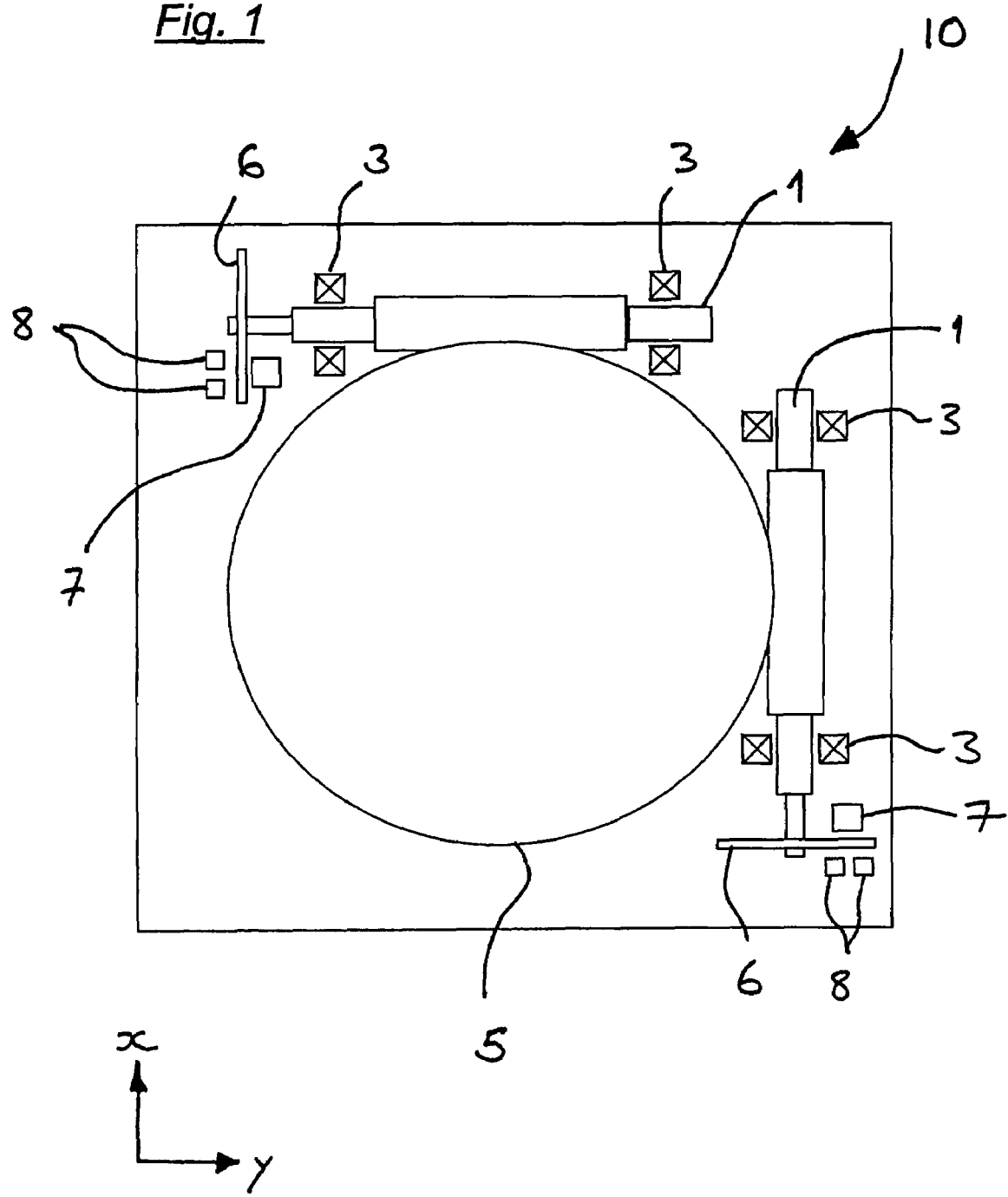

FIG. 1 is an illustrative representation of one such arrangement. As shown, the trackball 10 includes a pair of shafts 1 that have been set (at least approximately) at right angles to one another. Each shaft 1 is rotatably mounted in a pair of bearings 3, and a ball 5 bears against each of the two shafts.

The ball 5 is moveable in an X-Y plane (indicated in FIG. 1) such that movement of the ball in a direction parallel to the X axis causes one shaft to rotate (by virtue of the friction coupling between the ball 5 and shaft 1), and movement of the ball in a direction parallel to the Y axis causes the other shaft to rotate. Any other movement of the ball causes both shafts to rotate.

Each shaft carries a slotted encoder disk 6, and each disk 6 is arranged to rotate between an emitter 7 (typically an LED) and a pair of detectors 8 of an optical emitter/detector pair.

In a manner known in the art, rotation of the disks converts the constant beam of light from the emitters 7 into a series of pulses which are detected by the detectors 8 and converted into substantially sinusoidal current signals. In a typical arrangement, the photosensors of each emitter/detector pair comprise a pair of phototransistors, and the photosensors of each optical emitter/detector pair are positioned with respect to the emitter (and hence the associated slotted encoder disk) in such a way as to impart a phase difference to the generally sinusoidal current signals output by each photosensor.

In such a system, the sine-wave current signals generated by the photosensors of a given emitter/detector pair are each driven through a resistor to provide a voltage that is passed to a Schmitt trigger (or equivalent electronic device). The Schmitt triggers (i.e. one for each photosensor) are configured to go high when the input voltage exceeds a predetermined trigger voltage, and go low when the input voltage drops below that predetermined trigger voltage. In this way the Schmitt triggers convert the generally sinusoidal input signals output by their associated photosensors into a quasi square-wave output signal, the frequency of which is directly proportional to the speed of encoder disk (and hence ball) movement in the aforementioned X and Y axes respectively.

The direction of encoder disk, and hence ball, movement can be determined simply by observing which of the two signals output by each of the Schmitt triggers goes high (or low) first—it being appreciated that in one direction of rotation, the signal from one of the two triggers will go high (or low) before the other and that in the other direction of rotation the other trigger will go high (or low) before the one trigger.

As will be appreciated by those persons skilled in the art, for this system to function adequately it is important that the signals processed by the Schmitt triggers are substantially the same, albeit 90° out of phase. The reason for this is that as the Schmitt triggers go high and low when the input signal exceeds or drops below a predetermined reference voltage, an amplitude mismatch between the sinusoidal signals output by the photosensors would cause each trigger to go high/low at different relative points in the respective sine waves output by their associated photosensors, and hence would adversely affect both the determination of the direction and speed of rotation of the disk, and hence the ball.

The simplest way to avoid such problems is to ensure that the two photosensors of each emitter/detector pair are closely matched to one another, thereby ensuring that the amplitudes of each output sine wave are generally equivalent. Unfortunately, such closely matched photosensors are relatively expensive items, and for economic reasons such a solution is simply not practical.

To avoid having to use expensive matched photosensors, it is usual to trim the conditioning circuitry so that the sinusoidal voltage signals presented to each trigger are generally of the same amplitude. This is most easily done by choosing different resistances for the respective resistors through the two current signals generated by the photosensors are driven.

To determine an appropriate value for each of the resistors, it is normal for an operator to place the circuit board (on which the photosensors of a given emitter/detector pair and the conditioning circuitry are mounted) on a jig, to measure the relative amplitudes of the output current signals, to select appropriate resistors, and then to hand solder the appropriate resistors to the circuit boards. Such a process, whilst providing for the use of much less expensive relatively poorly matched photosensors, is highly labour intensive, takes a considerable amount of time, and is open to error.

It would be advantageous, therefore, if a means could be devised to avoid having to trim such circuitry without having to resort to using relatively expensive closely matched photosensors.

The invention has been conceived with the aim of avoiding or at least mitigating such problems.

The invention provides signal conditioning circuitry for an optical pointing device, the circuitry comprising:

means for determining the rate of change of a signal generated on periodic illumination of a photodetector, and outputting a signal representative of said determined rate of change; and means for comparing the signal output by said determining means to a reference voltage.

The invention also includes signal conditioning circuitry for an optical pointing device, the circuitry comprising: a differentiator having an input to which a signal generated on periodic illumination of a photodetector is supplied, the differentiator being operable to determine the rate of change of the signal input thereto and to output a signal representative of said determined rate of change and a Schmitt trigger operable to compare said output signal to a predetermined reference voltage.

The invention also includes signal conditioning circuitry in an optical pointing device, said circuitry comprising a circuit for outputting signals proportional to X-direction movement and a circuit for outputting signals proportional to Y-direction movement, each said circuit comprising a detector arrangement for detecting movement of a respective body representative of said X- and Y-direction movement and outputting a signal in response thereto, means for determining a rate of change of said signal and outputting a signal representative of said determined rate of change and means for comparing said signal output by said determining means to a reference voltage.

Figure 2:
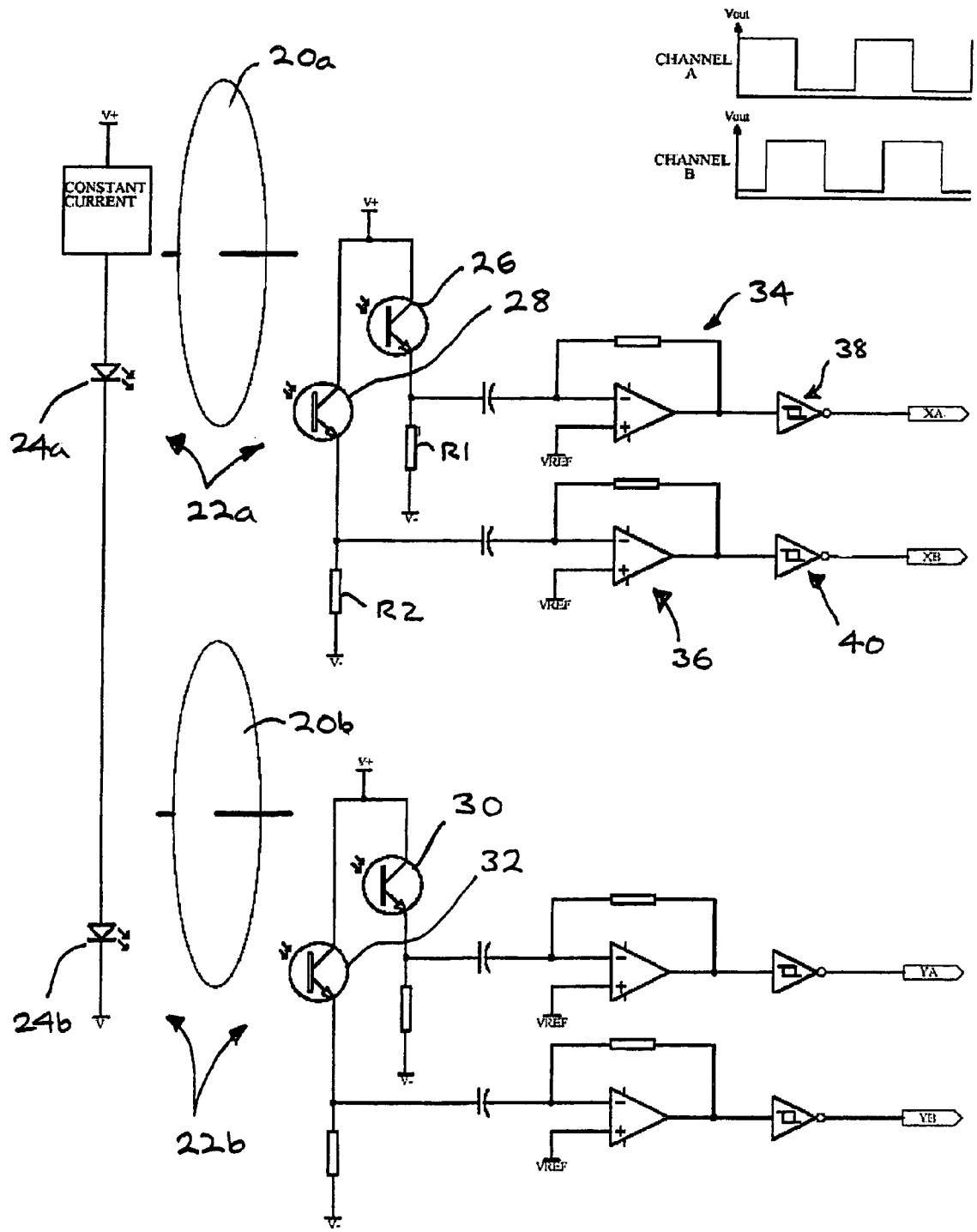

In order that the invention may be well understood, an embodiment thereof, which is given by way of example only will now be described, with reference to the accompanying drawings, in which:

FIG. 1 is a schematic representation of a previously proposed pointing device; and FIG. 2 is a schematic representation of signal conditioning circuitry in accordance with a preferred embodiment of the present invention.

Referring now to FIG. 2, there is shown a schematic representation of two encoder disks 20a, 20b and two emitter/detector pairs 22a, 22b.

In this instance, the first encoder disk 20a is coupled to a shaft (not shown) that rotates (to rotate the encoder disk) as a ball (also not shown) rotates in the X direction. The second encoder disk 20b is coupled to a shaft (not shown) that rotates (to rotate the encoder disk) as a ball (also not shown) rotates in the Y direction. The first emitter/detector pair 22a detects movement of the disk in the X direction, and the second 22b detects movement of the disk in the Y direction.

Each emitter/detector pair comprises a light source 24a, 24b (in this instance an LED) and an associated pair of photodetectors 26, 28/30, 32. The photodetectors are all preferably phototransistors. The photodetectors 26, 28/30, 32 are positioned with respect to their respective light sources 24a, 24b in such a way that the respective signals generated by the two photodetectors of each pair are substantially 90° out of phase. By way of example, with an arrangement as shown in FIG. 1 with the two detectors in the same horizontal plane, the detectors would have to be at different positions about the encoder disc axis, in the vertical plane, in order to provide the required phase relationship.

The circuitry for conditioning signals representative of movement in the Y axis is identical to that for conditioning signals representative of movement in the X axis and so, for the sake of brevity, only the operation of the circuitry for conditioning signals representative of movement in the X axis will be described.

Each photodetector 26, 28 is coupled between a regulated voltage V+ and ground by way of respective resistors R1, R2. The resistors are of the same (or substantially the same) resistance. Current output from the photodetectors 26, 28 is driven through the resistances R1, R2 to provide a voltage signal for subsequent conditioning in the signal conditioning circuitry. Signals driven from the first photodetector 28 through the subsequent circuitry provide signals on one channel XB, and signals driven from the second photodetector 26 through the subsequent circuitry provide signals on another channel XA. Comparison of the output of the two channels XA, XB provides a means to detect the direction of movement in the X direction.

The voltage signals from the resistor/photodetector assembly of each of channels XA and XB are driven through respective conditioning circuitry comprising a differentiator circuit 34, 36 and a Schmitt trigger 38, 40.

The differentiator circuits 34, 36 function to measure the rate of change in the generally sinusoidal signals output by the photodetectors with reference to a regulated reference voltage $V_{Ref}$, and output a substantially square wave pulse train for processing by the Schmitt triggers 38, 40.

The advantage of this arrangement is that whilst the amplitude of the signals output by the photodetectors might differ relatively significantly (for example because the photodetectors are not expensive matched detectors), the period of the sinusoidal signals will be identical, and hence the rate of change between the two signals will be substantially the same. It follows, therefore, that by passing the signals output from the photodetectors through respective differentiator circuits, amplitude variations in the signals from the photodetectors can effectively be nullified, and hence the need to trim the conditioning circuitry is avoided without having to turn to expensive matched photodetectors.

Signal conditioning circuitry according to the embodiment allows the construction of a pointing device without significant manual intervention and, so, the cost and time take to produce such devices can be reduced.

It will be understood that the invention is not limited to the embodiment and that many modifications are possible. For example, whilst the embodiment employs Schmitt triggers and it will be apparent that these devices are preferred for their operating speed, a comparator could instead be used. It will also be understood that the discrete components of the embodiment could instead be implemented by means of an integrated circuit, or indeed an application specific integrated circuit, and, hence, that the invention is limited solely to electronic components connected together on a circuit board.

It should also be noted that whilst various preferred features of the present invention have been claimed hereafter, the scope of the present invention is not limited to those features explicitly enumerated in the accompanying claims. Rather, the scope of the present invention extends to encompass any combination of features herein described irrespective of whether that combination has explicitly been described in the accompanying claims.

The invention claimed is:

1. Signal conditioning circuitry for an optical pointing device comprising a photodetector which upon periodic illumination generates a periodic signal, the circuitry comprising:

means for determining the rate of change of said periodic signal independently of the amplitude of said periodic signal, and for generating an output signal representative of said predetermined rate of change; and means for comparing said output signal to a reference voltage.

2. Circuitry according to claim 1, wherein the determining means comprises a differentiator.

3. Circuitry according to claim 1 or 2, wherein the comparing means comprises a comparator.

4. Circuitry according to claim 1 or 2, wherein the comparing means comprises a Schmitt trigger.

5. Signal conditioning circuitry for an optical pointing device comprising a photodetector which upon periodic illumination generates a periodic signal, the circuitry comprising:
- a differentiator receiving as input said periodic signal, the differentiator being operable to determine the rate of change of said periodic signal independently of the amplitude of said periodic signal and to generate an output signal representative of said determined rate of change, and
- a Schmitt trigger operable to compare said output signal to a predetermined reference voltage.

6. Signal conditioning circuitry for an optical pointing device, said circuitry comprising a circuit for outputting signals proportional to X-direction movement and a circuit for outputting signals proportional to Y-direction movement, each said circuit comprising a detector arrangement for detecting movement of a respective body of said X- and Y-direction movement and outputting a signal in response thereto, means for determining a rate of change of said signal and outputting a signal representative of said determined rate of change and means for comparing said signal output by said determining means to a reference voltage.

7. Circuitry according to claim 6, wherein each said body is rotatable about an axis of rotation and the respective detector arrangements each comprise two detectors disposed about the respective axes of rotation so as to provide respective output signals that are out of phase for determining the direction of rotation of the respective body.

8. Circuitry according to claim 7, wherein each said determining means comprises respective differentiators for receiving signals outputted by the two detectors.

9. Circuitry according to claim 8, wherein each said comparing means comprises respective Schmitt triggers connected in series with said differentiators.

10. An optical pointing device comprising signal conditioning circuitry as claimed in any one of claims 1, 5, or 6.

11. Signal conditioning circuitry as claimed in to any one of claims 1, 5, or 6 wherein said periodic signal is a sinusoidal signal.

* * * * *